(12) United States Patent
Jones

(10) Patent No.: US 8,533,735 B2
(45) Date of Patent: Sep. 10, 2013

(54) SYSTEM FOR EXECUTION CONTEXT ISOLATION IN RESPONSE TO INVOKING A BIOS KERNEL FUNCTION DURING A DRIVER EXECUTION ENVIRONMENT (DXE) PHASE OF BOOT-UP OF A COMPUTER

(75) Inventor: Stephen E. Jones, Bellevue, WA (US)

(73) Assignee: Kinglite Holdings Inc., Singapore (SG)

(*) Notice: Subject to any disclaimer, the term of this patent is extended or adjusted under 35 U.S.C. 154(b) by 749 days.

(21) Appl. No.: 12/610,224

(22) Filed: Oct. 30, 2009

(65) Prior Publication Data

US 2010/0319000 A1 Dec. 16, 2010

Related U.S. Application Data

(60) Provisional application No. 61/268,562, filed on Jun. 13, 2009.

(51) Int. Cl.
| | |
|---|---|
| G06F 9/46 | (2006.01) |
| G06F 15/177 | (2006.01) |
| G06F 1/26 | (2006.01) |
| G06F 9/455 | (2006.01) |

(52) U.S. Cl.
USPC .............. 718/108; 718/102; 718/1; 713/1; 713/2; 726/34

(58) Field of Classification Search
None
See application file for complete search history.

(56) References Cited

U.S. PATENT DOCUMENTS

| | | | |
|---|---|---|---|
| 6,751,737 B1 * | 6/2004 | Russell et al. .............. 726/34 |
| 7,003,759 B2 | 2/2006 | Jameson | |
| 7,392,527 B2 | 6/2008 | Callender | |
| 8,176,488 B1 * | 5/2012 | Dobrovolskiy et al. ........ 718/1 |
| 2006/0069534 A1 | 3/2006 | Kinney | |
| 2008/0005615 A1 | 1/2008 | Brenden et al. | |
| 2008/0163209 A1 | 7/2008 | Rozas et al. | |
| 2009/0293065 A1 | 11/2009 | Kinney | |
| 2010/0319001 A1 | 12/2010 | Jones | |

OTHER PUBLICATIONS

U.S. Appl. No. 12/631,961, Non-Final Office Action mailed Sep. 7, 2011 (25 pgs.).
"Local Procedure Call", en.wikipedia.org/wiki/Local_Procedure_Call, printed Nov. 6, 2009, 2 pgs.
"LPC Communication", www.zezula.net/en/prog/lpc.html, printed Nov. 6, 2009, 5 pgs.

* cited by examiner

*Primary Examiner* — Meng An
*Assistant Examiner* — Bing Zhao
(74) *Attorney, Agent, or Firm* — Lowe Hauptman & Ham, LLP

(57) ABSTRACT

Execution context isolation during the DXE phase of computer start-up. Provision is made for referencing and dereferencing execution contexts and thereby providing execution isolation across contexts. In response to invoking a BIOS kernel function during a Driver Execution Environment (DXE) phase of a boot-up of the computer, the BIOS kernel associates a first processor context with the sequence of instructions, determines that scheduling the sequence of instructions requires a switch from a second processor context to the first processor context, performs a context switch action, during the DXE phase of the boot-up of the computer, to switch from the second processor context to the first processor context.

18 Claims, 9 Drawing Sheets

| | |
|---|---|
| SEC 202 | Security<br>Pre-verifier |
| PEI 204 | Pre-EFI initialization<br>Includes CPU clock mode, chipset, board initialization, RAM hardware level configuration. |
| DXE 206 | Driver Execution Environment<br>Includes EFI Driver Dispatcher, intrinsic services, Device, Bus and Service DXE Drivers |
| BDS 208 | Boot Device Selection<br>Includes Boot Manager, GRUB |
| TSL 210 | Transient System Load<br>Includes loading and initializing O/S |
| RT 212 | Run Time<br>Includes final O/S environment and O/S based applications programs |
| AL 214 | After Life<br>Includes support for shutdown or hibernate procedures |

FIG.2

KeAllocateExecutionContext Function

The *KeAllocateExecutionContext* API function is called to create a new *Execution Context*, allowing processes that reference the *Execution Context* to be scheduled within that environment.

The caller specifies the human readable name associated with the context, used by the *KeAllocateProcess* function when it calls the *KeOpenExecutionContext* request to specify which context will be opened, once it is allocated.

Additionally, the caller specifies two pointers, each a routine to Reference and Dereference functions within the *Execution Context* driver. This allows the process manager to call these routines when the process is about to be dispatched, and when the process dispatch is over, respectively.

A handle to an *Execution Context* object is returned, owned by the current process. This handle may be passed do the *KeDeallocateExecutionContext* request to deallocate the *Execution Context* object.

Request Format:
    SCT_STATUS KeAllocateExecutionContext (
        IN PASCIIZ *Name*,
        IN PEXECUTION_CONTEXT_REFERENCE_ROUTINE *ReferenceRoutine*,
        IN PEXECUTION_CONTEXT_REFERENCE_ROUTINE *DereferenceRoutine*,
        IN UINTN *Context*,
        OUT PSCT_HANDLE *Handle*
        )

Parameters:
    *Name* – A pointer to an ASCIIZ string specifying the name of the *Execution Context* to be created.
    *ReferenceRoutine* – A pointer to a routine to be executed by the process manager when dispatching any process associated with this *Execution Context*, allowing the *Execution Context* to prepare the environment prior to any dispatchable object being given control.
        VOID EXECUTION_CONTEXT_REFERENCE_ROUTINE (
            IN OPTIONAL UINTN *Context*,
            IN HANDLE *ProcessHandle*,
            OUT PSCT_STATUS *StatusCode*
            )
    *Context* – A copy of the *Context* value supplied at the time the *KeAllocateExecutionContext* request was made.
    *ProcessHandle* – A handle to a process object being dispatched.
    *StatusCode* – A pointer to a storage location where the reference routine returns a system status code.

FIG.4E

*DereferenceRoutine* – A pointer to a routine to be executed by the process manager when dispatching has been completed, allowing the *Execution Context* to restore the environment after dispatch.
>   VOID EXECUTION_CONTEXT_DEREFERENCE_ROUTINE (
>     IN OPTIONAL UINTN *Context*,
>     IN HANDLE *ProcessHandle*,
>     OUT PSCT_STATUS *StatusCode*
>   )
>   *Context* – A copy of the *Context* value supplied at the time the *KeAllocateExecutionContext* request was made.
>   *ProcessHandle* – A handle to a process object whose dispatch is ending.
>   *StatusCode* – A pointer to a storage location where the dereference routine returns a system status code.
*Context* – An optional value supplied by the caller that may be used by the reference and dereference routines to obtain the instance data associated with the *Execution Context*.
*Handle* – A pointer to a storage location where a handle to the allocated *Execution Context* is returned.

FIG.4F

KeOpenExecutionContext Function
The *KeOpenExecutionContext* API function is called by the process manager to open an *Execution Context* by name, so that the process runs within that environment when it is dispatched.
A handle to an *Execution Context* object is returned, owned by the current process. This handle is passed do the *KeCloseExecutionContext* request when the process is deallocated.
Request Format:
>   SCT_STATUS KeOpenExecutionContext (
>     IN PASCIIZ *Name*,
>     OUT PSCT_HANDLE *Handle*
>   )
Parameters:
>   *Name* – A pointer to an ASCIIZ string specifying the name of the *Execution Context* to be opened.
>   *Handle* – A pointer to a storage location where a handle to the allocated *Execution Context* is returned.

FIG.4G

SYSTEM FOR EXECUTION CONTEXT ISOLATION IN RESPONSE TO INVOKING A BIOS KERNEL FUNCTION DURING A DRIVER EXECUTION ENVIRONMENT (DXE) PHASE OF BOOT-UP OF A COMPUTER

RELATED APPLICATIONS

This application claims priority to U.S. Provisional application for a patent No. 61/268,562 entitled INNOVATIONS IN SECURECORE TIANO 2.0 filed Jun. 13, 2009 inventor Stephen E. Jones and which is incorporated in its entirety by this reference.

FIELD OF THE INVENTION

The present invention generally relates to personal computers and devices sharing similar architectures and, more particularly relates to a system and corresponding method for execution isolation, especially, but not limited to a DXE (Driver Execution Environment) phase of a PC (personal computer) startup process. Similar processes within comparable computing apparatuses or within a single computer operational session or context also fall within the general scope of the invention.

BACKGROUND OF THE INVENTION

Modernly, the use of PCs (personal computers), including so-called laptop and notebook computers, is increasingly common and the computers themselves are ever more powerful and complex. A persistent problem is the unduly long elapsed time between the moment of power-on and the time when the PC has become ready for user stimulus and/or to initiate useful work.

Intel® Corporation first defined EFI (Extensible Firmware Interface) as the programming interface exposed by firmware to O/S (operating system); former comparable firmwares were not sufficiently portable nor scalable to Intel's CPU (Central Processor Unit) IA64 architecture. A first implementation of the EFI interface became known as Tiano, which Intel® Corporation offered under license via a web site. The UEFI Forum (Unified EFI Forum), a trade group, secured architectural control over EFI (and derivatives thereof) under a new name—UEFI, with a right to support and extend. The UEFI Forum documents and specifies the UEFI interface.

The PIWG (Platform Initialization Working Group) of the UEFI Forum provides a common internal framework for Silicon and platform drivers, so that a common understanding of the roles and methods used by Silicon and platform drivers is developed by implementers of UEFI firmware stacks together with the providers of the Silicon and platform drivers.

The UEFI and related standards provide richness, but fail to sufficiently address significant specific areas of concern including:

Quality of board bring-up user experience
Quality of BIOS customization experience
Duration of system bootloading and platform initialization time
Level of reliability
Level of compatibility with Intel's Foundation Core (also known as Foundation for short and a part of Tiano)
Scope for platform innovation by BIOS (basic input-output system) vendors and partners and customers thereof These attributes are described in the current version of SCT (SecureCore Tiano™) System Overview published by Phoenix® Technologies Ltd. Adequately addressing all of these areas of concern requires innovation above and beyond what is described in UEFI and PIWG standards. However, innovation needs to be at least backwards compatible with those same standards so as not to lose benefits of compliance therewith.

The EFI/UEFI environments provide for DXE (Driver Execution Environment) firmware running in a limited execution environment with a fixed control policy. A sole means of communication between drivers is the so-called Protocol, a means for drivers to publish pointers to internal routines and data so that other drivers may call and exploit them. Drivers, also known as device drivers are well-known in the computing arts. Although running in protected mode, with 32-bit or 64-bit addressability, the DXE environment implements drivers as connected islands of functional capabilities.

This environment relies on dependency expressions of protocols exposed by DXE drivers, and upon a schedule of DXE drivers to be loaded in a desirable order. Once loaded, DXE drivers are run once, publishing protocols as necessary, so that they might be called again only when their services are requested through published protocols. Limited services are provided by the Foundation for a DXE Driver to gain control on a timer tick, as well as being notified when an O/S loads or has finished loading. Functionality is thereby limited, perhaps unduly limited in view of the specific areas of concern previously mentioned. UEFI lacks a structural framework for execution that is sufficiently flexibly adaptable to problems presented in practical embodiments.

However, UEFI Specification(s) offer considerable richness by making it possible to combine drivers together into stacks in many different ways to form new compound capabilities. In this way UEFI compliant products may contemplate taking on a large problem space for the future.

While UEFI's protocols are well-defined, the execution vehicles providing support for drivers that implement these protocols in the native EFI environment is relatively primitive. There exists a need to provide a more feature-rich extension of the Foundation that provides for various needs. Described elsewhere is support for more modern programming paradigms. The present invention addresses, inter alia, the need for support for the multiple processor modes found in modern CPUs (Central Processor Units). Early CPUs, such as conventional eight-bit microprocessors may have provided for only one or two modes (for example, user mode and supervisor or interrupts-disabled mode). Modernly many modes are available and a need exists to support them within the pre-boot environment (or during the bootloading process itself as drivers become dynamically loaded). Processor state may be reflected in programmed features such as processor contexts and process contexts. These may include, for example but not limited to, real, protected and paging memory accessing, direct, pass-through and virtualized I-O (input-output operations), System management modes (for example providing common memory addressing directed by NorthBridge chips across VMs (virtual machines)), STMs (system management interrupt transfer monitors), multiple CPU core operation including changes in the number of active cores, cache operational modes, clock speeds and so on.

A significant advantage of embodiments of the invention over previously developed solutions is that it becomes possible to use multiple processor, memory and other instruction-controlling modes, especially but not limited to hardware modes within and around any and all DXE phases of computer loading and initialization.

SUMMARY OF THE INVENTION

The present invention provides a method for operating a computer and also an apparatus that embodies the method. In addition program products and other means for exploiting the invention are presented.

According to an aspect of the present invention an embodiment of the invention may provide a method for associating processor contexts with sequences of instructions such as by recording execution contexts memory; determining the need for a processor context; and switching contexts, such as by invoking one or more dereference routines for the old context and reference routine(s) for the new.

Execution contexts may (and for efficiency typically will) be shared by multiple threads in multiple drivers (including DXE drivers) and so corresponding data structures need to be allocated and opened including the assignment and usage of handles thereto.

BRIEF DESCRIPTION OF THE DRAWINGS

The aforementioned and related advantages and features of the present invention will become better understood and appreciated upon review of the following detailed description of the invention, taken in conjunction with the following drawings, which are incorporated in and constitute a part of the specification, illustrate an embodiment of the invention and wherein like numerals represent like elements, and in which:

FIG. 2 shows an event sequence diagram according to an embodiment of the present invention.

FIG. 4E and FIG. 4F, taken together shown a KPI (Kernel Programming Interface) specification for one particular embodiment of a Kernel program to implement a program called to Allocate an Execution Context.

FIG. 4G shows a KPI specification for a routine to Open an Execution Context according to an embodiment of the invention.

DETAILED DESCRIPTION OF THE INVENTION

Figure 1:
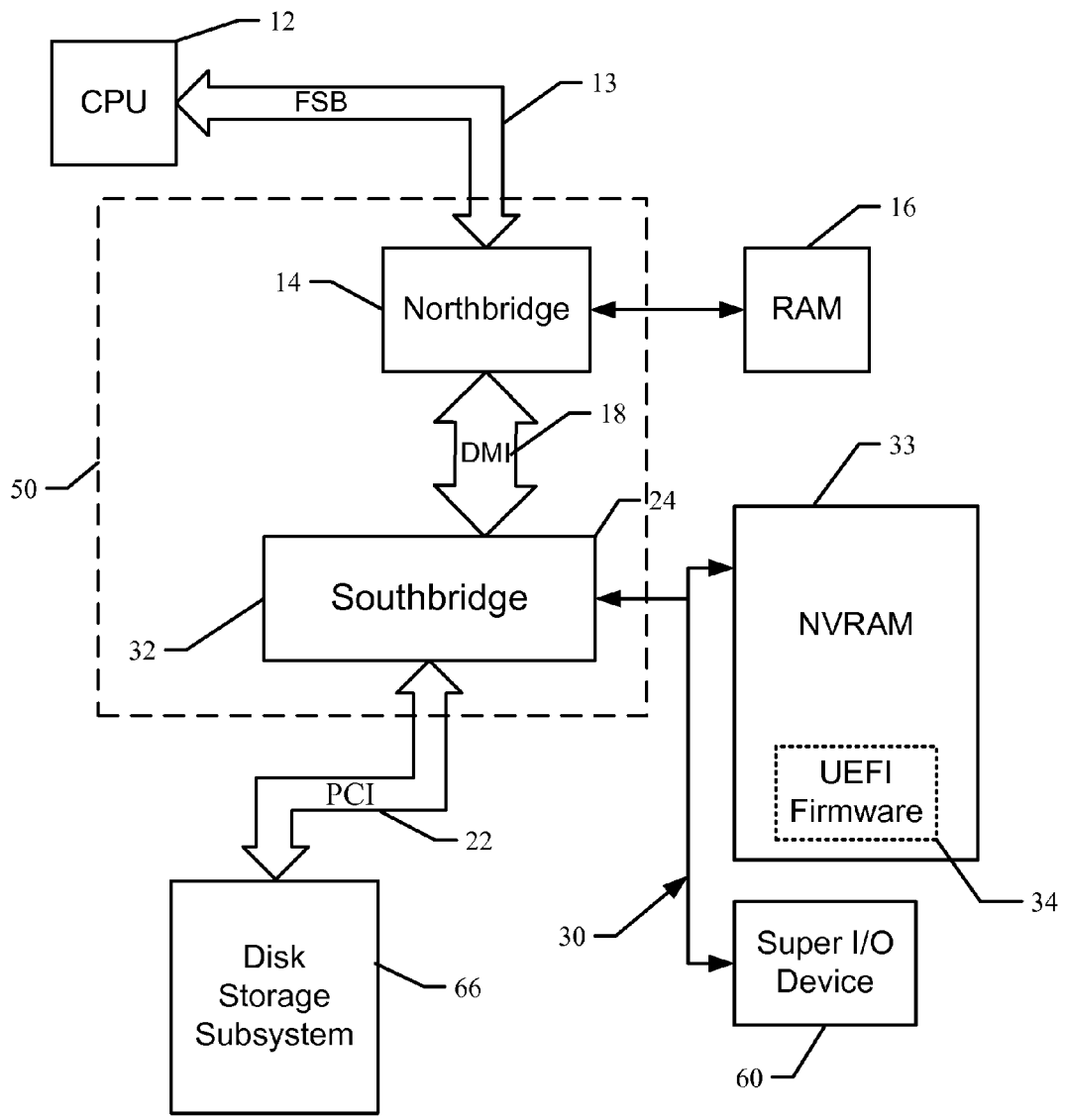
FIG. 1 is a schematic block diagram of an electronic device configured to implement the present invention.

The numerous components shown in the drawings are presented to provide a person of ordinary skill in the art a thorough, enabling disclosure of the present invention. The description of well known components is not included within this description so as not to obscure the disclosure or take away or otherwise reduce the novelty of the present invention and the main benefits provided thereby.

Embodiments of the disclosure presented herein provide methods, systems, apparatus, and computer-readable media for providing and utilizing a means for time saving parallel execution capability in a context of PC startup and initialization. In the following detailed description, references are made to the accompanying drawings that form a part hereof, and in which are shown by way of illustration specific embodiments or examples. Referring now to the drawings, in which like numerals represent like elements throughout the several figures, aspects of an exemplary operating environment and the implementations provided herein will be described.

An exemplary embodiment of the present invention will now be described with reference to the figures. FIG. 1 is a schematic block diagram of an electronic device configured to implement the operational functionality according to the present invention.

FIG. 1 shows a computer 10 that is operative to provide an EFI/UEFI firmware environment to provide a DXE phase and that facilitates timer use and timer based execution parallelism during the DXE phase and even beyond such as into the BDS phase. The computer 10 typically includes a baseboard, or motherboard form of printed circuit board to which a multitude of components or devices are connected by way of a system bus or other electrical communication path. In one illustrative embodiment, a CPU (central processing unit) 12 operates in conjunction with a chipset 50. The CPU 12 is a standard central processor that performs arithmetic and logical operations necessary for the operation of the computer.

Chipset 50 may include a Northbridge 14 and a Southbridge 32. The Northbridge 14 may be attached to CPU 12 by a FSB (Front Side Bus) 13 and typically provides an interface between the CPU 12 and the remainder of the computer 10. The Northbridge 14 may also provide an interface to a RAM (random access memory) 16 the main memory for the computer 10 and, possibly, to other devices such as an on-board graphics adapter (not shown in FIG. 1).

The Northbridge 14 is connected to a Southbridge 32 by a DMI (direct media interface) 18. The Southbridge 32 may be responsible for controlling many of the input/output functions of the computer 10 such as USB (universal serial bus), sound adapters, Ethernet controllers and one or more GPIO (general purpose input/output) port (None shown in FIG. 1). In one embodiment, a bus comprises a PCI (peripheral component interconnect) bus circuit 22 to which a disk storage subsystem 66 (often abbreviated to "disk") or other storage devices for storing an operating system and application programs may be attached.

The Southbridge 32 may also provide SMM (system management mode) circuits and power management circuitry. A peripheral interface 30 may also be provided by the Southbridge 32 for connecting a SuperI/O (Super input-output)

device 60. Southbridge 32 may also incorporate a timer circuit for generating timer circuit interrupts typically at periodic intervals.

As known to those skilled in the art, an O/S (operating system) such as may be stored on disk 66 comprises a set of programs that control operations of a computer and allocation of resources. An application program is software that runs on top of the O/S software and uses computer resources made available through the O/S to perform application specific tasks desired by the user.

Disk 66 may also provide non-volatile storage for the computer 10. Although the description of computer-readable media contained herein refers to a mass storage device, such as a hard disk or CD-ROM drive, it should be appreciated by those skilled in the art that computer-readable media can be any available media that can be accessed by the computer 10. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, serial EEPROM, flash memory or other solid state memory technology, CD-ROM, DVD, or other optical storage, magnetic cassettes, magnetic tape, magnetic disk storage or other magnetic storage devices well-known in the art, or any other medium which can be used to store the desired information and which can be accessed by the computer.

The peripheral interface 30 may also connect a computer storage media such as a ROM (Read-only memory, not shown) or, more typically, a flash memory such as a NVRAM (non-volatile random access semiconductor memory) 33 for storing UEFI platform firmware 34 that includes program code containing the basic routines that help to start up the computer 10 and to transfer information between elements within the computer 10. The UEFI firmware 34 is compatible with the UEFI Specification.

It should be appreciated that the computer 10 may comprise other types of computing devices, including hand-held computers, embedded computer systems, personal digital assistants, and other types of computing devices known to those skilled in the art. It is also contemplated that the computer 10 may not include all of the components shown in FIG. 1, may include other components that are not explicitly shown in FIG. 1, or may utilize an architecture different from that shown in FIG. 1.

FIG. 2 shows an event sequence diagram to illustrate an embodiment of operations performed by a computer system initializing in a EFI/UEFI conforming manner, that is following the EFI/UEFI Framework and according to an embodiment of the invention. Details regarding the operation and architecture of EFI/UEFI can be found in the appropriate previously developed and published documentation.

The process is divided into several phases, including a SEC (Security) phase 202, a PEI (Pre-EFI Initialization) phase 204, a DXE (Driver Execution Environment) phase 206, a BDS (Boot Device Selection) phase 208, a TSL (Transient System Load) phase 210, an O/S RT (Run-Time) phase 212, and an AL (After-Life) phase 214. The phases progressively provide a run-time environment for the PC applications.

The SEC phase 202 supports security checks from power-on initiation and authenticates the Foundation as a requirement prior to safely executing it.

The PEI phase 204 provides a standardized method of loading and invoking specific initial configuration routines for the processor, chipset, and motherboard. This phase initializes sufficient system to provide a stable base for continuing. Initialization of core components including CPU, chipset and main motherboard occurs. The PEI phase locates and configures memory and hands it off to the DXE phase immediately following.

The DXE phase 206 is where much of the implementation of embodiments of the invention is to be found. This is the phase during which most of the system initialization is performed. The DXE phase 206 uses a DXE Core, a DXE Dispatcher (also known as the Driver Dispatcher) and a plurality of DXE Driver programs. The DXE Core provides Boot Services, Runtime Services, and DXE Services. The Driver Dispatcher discovers, loads and initiates DXE Drivers according to a pre-defined sequence The DXE drivers initialize components and provide services (including software abstractions of some devices).

The BDS phase 208 further prepares the computer system to load an O/S. This may include such well known programs as GRUB (Grand Unified Bootloader)

The TSL phase 210 facilitates services to be available to an O/S loader. The RT (Run Time) phase 212, is largely software, rather than firmware controlled and includes application programs. EFI Runtime services reemerge in the AL (After Life) phase 214 in connection with winding-up operations.

Figure 3:
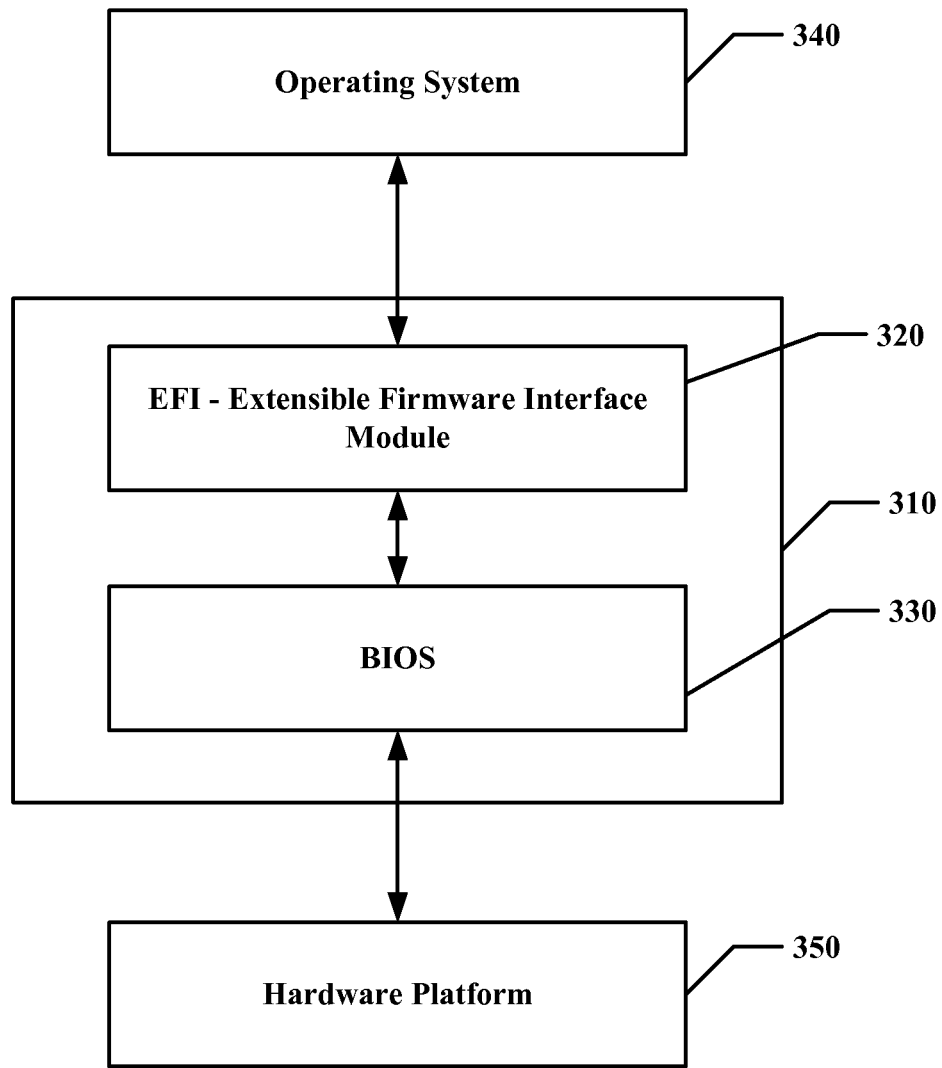
FIG. 3 shows relationships between major hardware, firmware and software components according to an embodiment of the invention.

FIG. 3 shows relationships between major hardware, firmware and software components according to an embodiment of the invention. Referring to FIG. 3, platform firmware 310 comprises one or more modules 320 compliant with the EFI Specification (Extensible Firmware Interface from Intel Corporation) or UEFI (Unified EFI) Specification (from the UEFI Forum—a trade organization). EFI and UEFI specifications describe an interface between O/S (Operating System) 340 and the platform firmware 310. EFI and UEFI specifications also describe the interface platform firmware 310 implements in support of bootloading interface used by O/S 340.

Platform firmwares are implemented in various ways within compliance with EFI and UEFI specifications and also include a BIOS 330 that provides a level of support for access to Hardware Platform 350. Hardware Platform 350 can itself come in multiple guises including hardware per se, as well as supporting microcoded engines and the like.

In previously developed EFI environments, DXE drivers are loaded into Boot Services memory, or Run Time memory, or SMRAM (System management random access memory) and are initialized. However, the isolation associated with driver loads is minimal which has various disadvantages such as the opening of exploits to malware or failure to limit damage due to unintentional malfunction.

In SCT 2.0 (Secure Core Tiano 2.0) products, the Kernel may implement an EC (Execution Context). This may be done for example by use of data and/or function objects such as are well-known in the programming arts. Software or firmware products implemented in DXE driver format may be used as EC provider services. Such EC providers may expose execution contexts for example by invoking a Kernel function to Allocate such an EC. EC providers may receive control from the Kernel whenever a DXE driver running in its context receives control, including during initialization, when its protocols are called, or alternatively whenever any of its dispatchable objects (not limited to, but for example threads, timers, DPCs (deferred procedure calls), interrupts, power fail objects, or power notify objects) are dispatched. Other possibilities are well-known in the art, these may include labels (such as security and reliability labels) that may be applied to VMs (virtual machines) or other subsystems; other examples include TXT (Trusted Execution Technology) measured environments (which are typically enabled or disabled responsive to needs) and various hardware configuration such as persistent states external to major "silicon" (memories chips, CPUs, and "chipset" chips)—this might include for example a flip-flop that control and external latch (for example an optical indicator circuit).

EC providers may perform the special handling that implements a virtual machine context, or the SMM context, or other contexts such as multiple core control, cache memory modes, hardware based memory control schemes and so on, including similar be not yet determined system, memory and processor operational modes and schemes.

EC providers may hook and/or virtualize access to EFI tables and services, may assert orderly control over them, for example so that isolation of the EFI run time environment may be improved.

EC providers, such as a virtualization EC provider, may also create virtual machines such as may be used to isolate groups or even individual DXE drivers or applications, even though those drivers or applications may be unaware of (the existence of) a virtual machine environment in which they operate. A virtual machine environment may establish a firewall (or similar feature) around drivers, inhibiting or reducing damage to a run time environment, or conversely as to incoming damage.

Figures 4A, 4B:
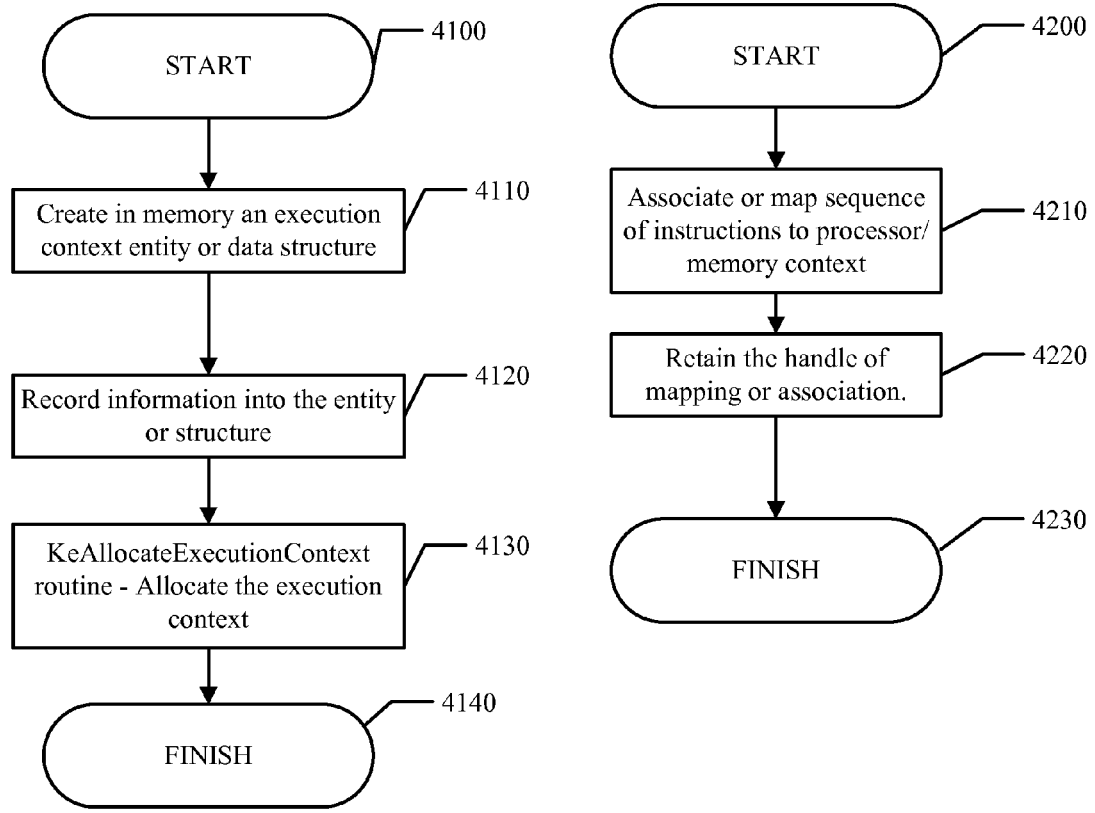
FIG. 4A shows a depiction of a sequence of acts in which part of an embodiment of the invention is implemented to provide to a Kernel function for allocating an EC (Execution Context).
FIG. 4B shows a depiction of a sequence of acts in which part of an embodiment of the invention is implemented to provide to a Kernel function for associating an EC (execution context) with a thread, process or other executable sequence of instructions.

Referring to FIG. 4A, a sequence of acts in which part of an embodiment of the invention is depicted in a context of an EFI or UEFI compliant PC startup sequence having completed the first phase of startup from power-on (the SEC or Security phase).

At Ref.4100 entry is made to a Kernel function for allocating an EC. At Ref.4110, a context entity or data structure or other suitable software or firmware artifact may be created typically according to the programming language being used to encode the instruction sequence involved. This may effectively create an EC image in memory or the like. In one embodiment of the invention, the structure includes provision for handles, pointers, table indexes or the like to map to at least a processor-context reference routine and a processor-context dereference routine.

At Ref. 4120 the various required information is recorded into the context entity or data structure (or similar). In an embodiment of the invention, a processor-context reference routine may provide instructions for placing the processor (eg CPU) or other chipset of platform hardware or register contents in a particular mode that may be required or desired for running a particular instruction sequence that "expects" (is designed to run in) a particular setup. There are many possibilities to related processor contexts to ECs. Some examples are described below.

In a similar manner, dereference routines mat be needed to leave a processor context in a tidy manner. Not all processor contexts can simply be preempted. For example if one processor context expects all cores in a multiple core CPU to be operating and another context requires that only a single core is active then the "multiple core" context may very well need to be brought to a quiescent state in an orderly manner, perhaps by completing instruction sequences and flushes instruction caches before it is safe to reference the new context.

Features for naming the EC by symbolic name and by a shortcut (including by a handle) may also typically be required and provided though these need not be a critical feature of the invention. Other means for locating routines, such as reference and dereference routines are well-known in the art and are substantially functionally equivalent, for example memory pointers may be used, or jump table indices or various other artifacts commonly known to computer programmers.

At Ref.4130, a function is invoked to actually allocate the EC (execution context). The effect will be implementation dependent. In one embodiment of the invention a KeAllocateExecutionContext routine is used, it will provide means for later associating the EC with other objects and to provide for mapping another object to its EC. At Ref.4140 the Kernel function for allocating an EC ends, typically via a "return" instruction sequence or other means.

Referring now to FIG. 4B, another sequence of acts of part of an embodiment of the invention is depicted At Ref.4200 entry is made to a Kernel function for associating an EC (execution context which typically be a processor and/or memory context) with a thread, process or other executable sequence of instructions (according to the prevailing programming environment). In a typical embodiment of the invention there will be multiple ECs and also multiple threads, processes or similar entities associated with at least one of the ECs.

In a simple embodiment of the invention using threads, there could be an EC for a first set of page tables applicable to a protected mode memory view as perceived by a first DXE driver, and a EC for a second set of page tables for a second protected memory view for a second DXE driver and then there may be still another EC that describes an SMM context with its own view of its execution environment for which the memory addressing may typically cut across multiple VMs or indeed multiple CPU cores used for execution. Again, computer mechanisms which may not strictly be functions but which perform substantially as functions would do should be considered to be within the general scope of the invention, and such techniques are well-known in the art.

At Ref.4210, a sequence of instructions is mapped or associated with the pertinent EC. In one embodiment of the invention a KeOpenExecutionContext routine is used, it typically provides a handle which is retained so that later, when the associated thread is to be scheduled to be imminently run, the EC context needed by that particular thread is easily identified. An exemplary KeOpenExecutionContext is described below. It will be appreciated that, just as there are many ECs provided for, so they will each be opened for at least one thread, process or etc. (typically many more than one).

At Ref. 4220, the handle of the mapping or association is typically stored away in memory for use later. The use of handles is exemplary only, there are other ways to map or associate well-known in the art, for example table indexes or pointers. In this way multiple threads (and the like) may be mapped to a common EC while others are mapped to other ECs. At Ref.4230 to acts of associating or mapping threads, processes and/or the like to ECs reaches a finish.

Figure 4C:
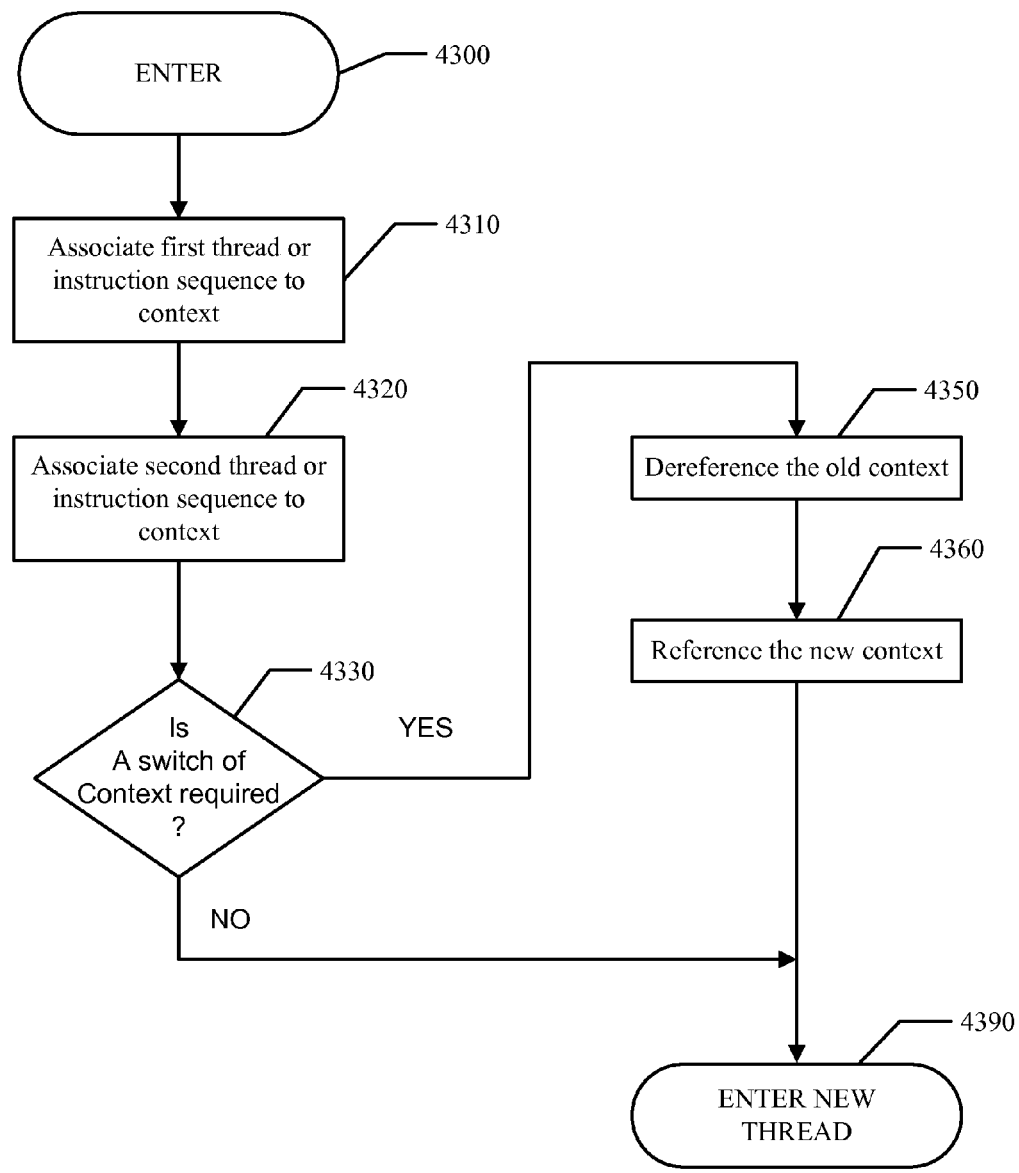
FIG. 4C shows a depiction of a sequence of acts in which part of an embodiment of the invention is implemented to provide to a Kernel function for scheduling, activating or entering a thread, process or similar sequence of instructions.

Referring now to FIG. 4C, a still further sequence of acts in which part of an embodiment of the invention is depicted. At Ref.4300 entry is made to a Kernel function for scheduling, activating or entering a thread, process or similar sequence of instructions. This sequence may typically be needed when a thread (or the like) is to be scheduled to be run in replacement of a thread (etc.) that may have completed its time slot (or is becoming displaced for some other reason). As described below, it can be determined (such as by a comparison of EC handles) whether the "next to be run" thread necessitates a switch of EC or whether it can continue running in the extant EC.

At Refs. 4310 and 4320 associations of mappings between threads (and the like) and contexts (especially ECs) are made. Each may be substantially the acts described in connection with FIG. 4B. This may take place at any time before, but no later than immediately before there is a wish to switch execution from the first thread (or etc) into the second.

At Ref. 4330, a determination is made as to whether switching from first to second thread requires a switch of EC. If the first and second threads (i.e. thread being left and thread being entered) run in the same EC then no switch of EC is needed. In this case of no switch the determination may (for example) be made by comparing the EC handles associated with each thread for equality or may be made in any of many other ways as will be apparent to those of ordinary skill in the art. If no switch is to be made then the newly scheduled thread, process, instruction sequence or etc. is entered, at Ref 4390.

Conversely, if the ECs differ and so a change of processor context may be required then at Ref 4350 the Dereference facility or routine etc associated with the first (old) thread is invoked. Then at Ref 4360, the Reference routine for the new thread (or etc) is invoked and then the thread is entered at Ref 4390. In an embodiment of the invention the dereference and reference routines are located (i.e. discovered) through the information recorded in the EC data structure (or comparable programmed feature).

Figure 4D:
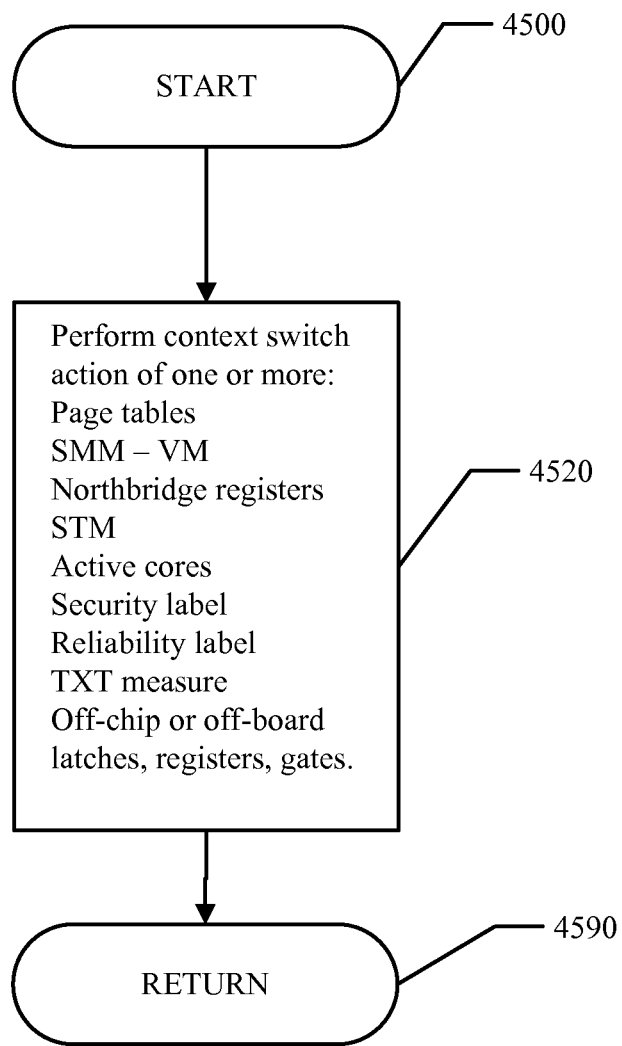
FIG. 4D shows a depiction of a sequence of acts in which part of an embodiment of the invention is implemented to provide to a Kernel function for a reference or deference function.

Referring to FIG. 4D, this shows entry (Ref. 4500), performance (Ref, 4520 and exit (ref 4590) of various possibilities for a reference or deference function. Or, indeed in some embodiments of the invention implementation may provide for combined dereference-reference activities into a single function, routine process or the like. Such may be an attractive optimization in cases where there are relatively few ECs or switching between two particular modes may be common and frequently repeated. In a similar way dereferencing and referencing may be broken out into multiple parts each separately functions. Such optimizations are well known in the art to have a measure of utility and equivalence.

Examples of entities that could be changed in the course of dereferencing or referencing may include, for example, one or more of: —reloading or modifying page tables, entering or leaving SMM (system management mode) or VMM (Virtual memory mode), setting or resetting Northbridge chip registers, entering or leaving STM (SMI Transfer Monitor), changing a number or arrangement of active cores (in a multiple core system), changing Security label and/or Reliability label (such labels are well-known in the art), TXT measures (Intel Trusted Execution Technology measured environments), or off-chip or off-board latches, registers, and gates. Various other possibilities related to particular machines will be apparent to those of ordinary skill in the art, and indeed it is to be expected that equivalent and comparable features will be invented in the future and fall within the general scope of the invention.

FIG. 4E and FIG. 4F, taken together show a KPI (Kernel Programming Interface) specification for one particular embodiment of a Kernel program to implement a program called KeAllocateExecutionContext that implements functions as described in connection with FIG. 4A. Such specifications will be readily understood by persons of ordinary skill in the Kernel programming arts. Of particular interest are the parameters for Dereference and Reference routines which are named DereferenceRoutine and ReferenceRoutine respectively.

Similarly, FIG. 4G shows a KPI specification for a routine named KeOpenExecutionContext Function that substantially provides access to the features described in connection with FIG. 4B.

Figure 5:
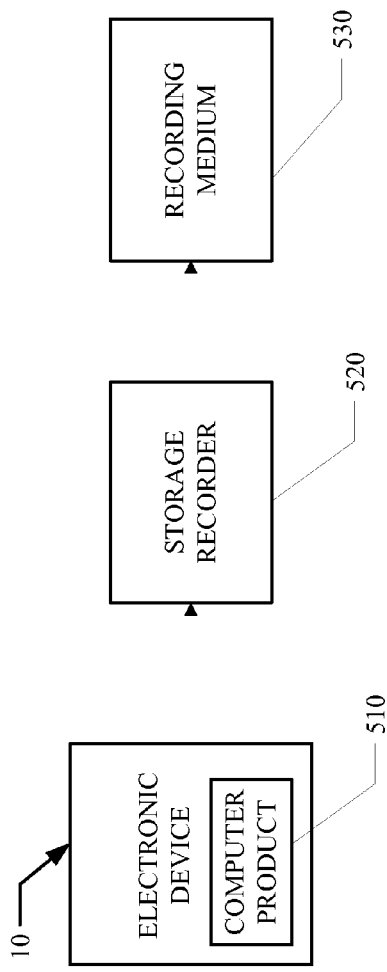
FIG. 5 shows how an exemplary embodiment of the invention may be encoded onto a computer medium or media.

With regards to FIG. 5, computer instructions to be incorporated into an electronic device 10 may be distributed as manufactured firmware and/or software computer products 510 using a variety of possible media 530 having the instructions recorded thereon such as by using a storage recorder 520. Often in products as complex as those that deploy the invention, more than one medium may be used, both in distribution and in manufacturing relevant product. Only one medium is shown in FIG. 5 for clarity but more than one medium may be used and a single computer product may be divided among a plurality of media.

Figure 6:
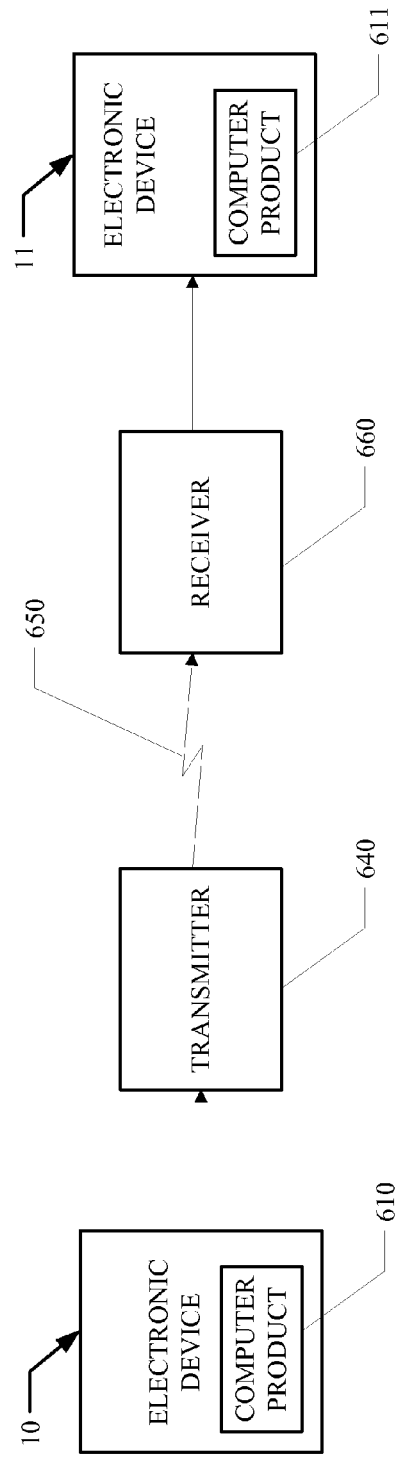
FIG. 6 shows how an exemplary embodiment of the invention may be encoded, transmitted, received and decoded using electro-magnetic waves.

FIG. 6 shows how an exemplary embodiment of the invention may be encoded, transmitted, received and decoded using electro-magnetic waves.

With regard to FIG. 6, additionally, and especially since the rise in Internet usage, computer products 610 may be distributed by encoding them into signals modulated as a wave. The resulting waveforms may then be transmitted by a transmitter 640, propagated as tangible modulated electro-magnetic carrier waves 650 and received by a receiver 660. Upon reception they may be demodulated and the signal decoded into a further version or copy of the computer product 611 in a memory or other storage device that is part of a second electronic device 11 and typically similar in nature to electronic device 10.

Other topologies and/or devices could also be used to construct alternative embodiments of the invention. The embodiments described above are exemplary rather than limiting and the bounds of the invention should be determined from the claims. Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for executing a sequence of instructions in a device comprising a computer, comprising:
   in response to invoking a BIOS kernel function during a Driver Execution Environment (DXE) phase of a boot-up of the computer, performing the BIOS kernel function by:
   the BIOS kernel executing a function to allocate a processor context for a first execution context, comprising recording in memory: a first means for locating a processor-context reference routine for the first execution context and a second means for locating a processor-context dereference routine for the first execution context;
   the BIOS kernel associating the first execution context with the sequence of instructions;
   the BIOS kernel determining that scheduling the sequence of instructions requires a switch from a second execution context to the first execution context;
   the BIOS kernel performing a context switch action, during the DXE phase of the boot-up of the computer, to switch from the second execution context to the first execution context; and
   after performing the context switch action, executing the sequence of instructions in the first execution context.

2. The method of claim 1 wherein the BIOS kernel performing the context switch action further comprises: (a) the BIOS kernel invoking at least one context dereference routine or context dereference facility for the second execution context; and (b) the BIOS kernel invoking at least one context reference routine or context reference facility for the first execution context.

3. The method of claim 1 wherein: the performing of the context switch action comprises invoking a combined deference-reference modal facility for dereferencing the second processor context and referencing the first processor context.

4. The method of claim 1 wherein: the performing of the context switch action comprises a switching of virtual memory page tables.

5. The method of claim 1 wherein: the performing of the context switch action comprises a switching of VM (virtual machine) input-output address space.

6. The method of claim 1 wherein: the performing of the context switch action comprises a switching between a SMM (System Management Mode) and a VM (virtual machine) mode.

7. The method of claim 1 wherein: the performing of the context switch action comprises a switching of memory management modes that are controlled by a Northbridge.

8. The method of claim 1 wherein: the performing of the context switch action comprises enabling or disabling a STM (System Management Interrupt Transfer Monitor).

9. The method of claim 1 wherein: the performing of the context switch action comprises changing a parameter that specifies number of active cores in a CPU (central processing unit) of the computer.

10. The method of claim 1 wherein: the performing of the context switch action comprises changing a memory system comprised within the CPU (central processing unit) of the computer from a caching function to a RAM (random access memory) function.

11. The method of claim 1 wherein: the performing of the context switch action comprises changing a label selected from a list consisting of a security label and a reliability label.

12. The method of claim 1 wherein: the performing of the context switch action comprises changing to or from a TXT (Trusted Execution Technology) measured environment.

13. The method of claim 1 wherein: the performing of the context switch action comprises changing a persistent hardware state external to a component of the device selected from a list consisting of a memory and a CPU (central processor unit).

14. The method of claim 1, further comprising:
the BIOS kernel mapping, to the processor context for the first execution context, a first entity selected from a list consisting of a first handle or a first locating means, the first entity being associated with the sequence of instructions; and
the BIOS kernel mapping, to the processor context for the first execution context, a second entity selected from a list consisting of a second handle or a second locating means, the second entity being associated with a further sequence of instructions.

15. A non-transitory computer readable storage medium storing one or more sequences of instructions, which when executed by one or more processors, cause: in response to invoking a BIOS kernel function during a Driver Execution Environment (DXE) phase of a boot-up of a computer, performing the BIOS kernel function by:
the BIOS kernel executing a function to allocate a processor context for a first execution context, comprising recording in memory: a first means for locating a processor-context reference routine for the first execution context and a second means for locating a processor-context dereference routine for the first execution context;
the BIOS kernel associating the first execution context with the sequence of instructions;
the BIOS kernel determining that scheduling the sequence of instructions requires a switch from a second execution context to the first execution context;
the BIOS kernel performing a context switch action, during the DXE phase of the boot-up of the computer, to switch from the second execution context to the first execution context;
and
after performing the context switch action, executing the sequence of instructions in the first execution context.

16. The non-transitory computer readable storage medium of claim 15 wherein the BIOS kernel performing the context switch action further comprises: (a) the BIOS kernel invoking at least one context dereference routine or context dereference facility for the second execution context; and (b) the BIOS kernel invoking at least one context reference routine or context reference facility for the first execution context.

17. An electronic device comprising:
a controller; and
a memory having instructions encoded therein, the instructions, when executed by the controller cause:
in response to invoking a BIOS kernel function during a Driver Execution Environment (DXE) phase of a boot-up of the computer, performing the BIOS kernel function by:
the BIOS kernel executing a function to allocate a processor context for a first execution context, comprising recording in memory: a first means for locating a processor-context reference routine for the first execution context and a second means for locating a processor-context dereference routine for the first execution context;
the BIOS kernel associating the first execution context with the sequence of instructions;
the BIOS kernel determining that scheduling the sequence of instructions requires a switch from a second execution context to the first execution context;
the BIOS kernel performing a context switch action, during the DXE phase of the boot-up of the computer, to switch from the second execution context to the first execution context; and
after performing the context switch action, executing the sequence of instructions in the first execution context.

18. The electronic device of claim 17 wherein the BIOS kernel performing the context switch action further comprises: (a) the BIOS kernel invoking at least one context dereference routine or context dereference facility for the second execution context; and (b) the BIOS kernel invoking at least one context reference routine or context reference facility for the first execution context.

* * * * *